United States Patent
Mobbs et al.

(10) Patent No.: US 8,386,474 B2
(45) Date of Patent: Feb. 26, 2013

(54) GENERATION OF QUERY LANGUAGE PARAMETER FILE

(75) Inventors: David M. Mobbs, Vitry sur Seine (FR); Pierre-Emmanuel Gros, Paris (FR)

(73) Assignee: SAP France S.A., Levallois-Perret (FR)

(*) Notice: Subject to any disclaimer, the term of this patent is extended or adjusted under 35 U.S.C. 154(b) by 856 days.

(21) Appl. No.: 12/276,588

(22) Filed: Nov. 24, 2008

(65) Prior Publication Data

US 2010/0131539 A1   May 27, 2010

(51) Int. Cl.
G06F 7/00 (2006.01)
(52) U.S. Cl. .................................. 707/722; 707/803
(58) Field of Classification Search .................. 707/756, 707/722, 803
See application file for complete search history.

(56) References Cited

U.S. PATENT DOCUMENTS

| | | | |
|---|---|---|---|
| 6,795,819 B2 * | 9/2004 | Wheeler et al. | 707/691 |
| 8,166,026 B1 * | 4/2012 | Sadler | 707/725 |
| 2006/0277029 A1 * | 12/2006 | Green et al. | 704/4 |
| 2010/0036802 A1 * | 2/2010 | Tsuruta et al. | 707/707 |
| 2010/0131569 A1 * | 5/2010 | Jamison et al. | 707/803 |

OTHER PUBLICATIONS

Documentation—"SQLiser User Guide," Hyfinity, Retrieved Sep. 12, 2008. Retrieved from Internet URL: http://www.hyfinity.net/pxpdocumentation/XPlatform/SQLiser%20User%20Guide/print.html, 10pgs.*

"SwisSQL Console 4.2: SQL Query Translation / Conversion Tool", Retrieved Sep. 12, 2008. Retrieved from Internet: URL: http://www.swissql.com/products/sql-translator/sql-converter.html, 2pgs.
Documentation—"SQLiser User Guide", Hyfinity®, Retrieved Sep. 12, 2008. Retrieved from Internet: URL: http://www.hyfinity.net/pxpdocumentation/XPlatform/SQLiser%20User%20Guide/print.html, 10pgs.

* cited by examiner

*Primary Examiner* — Robert Beausoliel, Jr.
*Assistant Examiner* — Alexandria Bromell
(74) *Attorney, Agent, or Firm* — Buckley, Maschoff & Talwalkar LLC

(57) ABSTRACT

Some aspects include determination of a data structure including a plurality of query language configuration parameters and at least two values associated with each of the plurality of query language configuration parameters, and generation, based on the data structure, of a first structured language query associated with a first value associated with one of the plurality of query language configuration parameters, and a second structured language query associated with a second value associated with the one of the plurality of query language configuration parameters. Also included are determination of a first expected query result associated with the first structured language query and a second expected query result associated with the second structured language query, query of a data source with the first structured language query and the second structured language query, reception of a first query result associated with the first structured language query and a second query result associated with the second structured language query, determination that the first query result matches the first expected query result and that the second query result does not match the second expected query result, and addition, to a query language configuration parameter file associated with the data source, of the one of the plurality of query language configuration parameters in association with the first value.

25 Claims, 5 Drawing Sheets

GENERATION OF QUERY LANGUAGE PARAMETER FILE

BACKGROUND

A conventional business software application accesses data from disparate data sources. These data sources may include different types of relational database management systems (RDBMSs), legacy software systems, and/or other software systems. Ideally, differences between the data sources are transparent to the business software application. In other words, to provide simplicity and efficiency, mechanisms are provided to enable the business software application to access each data source in an identical manner.

A software application typically accesses stored data by calling some type of middleware. This middleware, in turn, interacts with a connection server which is in communication with any number of different data sources. More particularly, the connection server provides a common Application Programming Interface which is accessed by the middleware to access data of the different data sources.

FIG. 1 is a block diagram of system 100 illustrating such a conventional arrangement. Business Intelligence module 110 (e.g., BusinessObjects XI), for example, requests data from BusinessObjects cube 120. Cube 120 creates a query using query technique 130 and sends the query to data source 140 through connection server 150.

Data source 140 is a relational data source (e.g., a RDBMS) which supports structured query language (i.e., SQL) queries. However, the particularities of the SQL supported by data source 140 may differ from the particularities of the SQL supported by another data source. As an example, some data sources support <<case sensitive>> SQL and some do not.

Since the engine of query technique 130 is generic, regardless of the data source, the system 100 requires configuration information to address differences in the data sources such as that described above. Query language parameter file 160 may address such differences by describing particularities of the SQL supported by data source 140. Parameter file 160 is typically and primarily composed of three parts: parameters which describe SQL syntax particularities (e.g., case sensitive, SORT BY syntax); available operators (e.g., addition, subtraction); and different kinds of supported functions (e.g., CONCAT, COUNT). Connection server 150 may therefore use the information of parameter file 160 to generate queries which conform to the particularities of the SQL supported by data source 140.

A new parameter file is required for each new data source to be added to system 100. Conventionally, this file is manually created by analyzing documentation to determine whether the data source supports each parameter, operator and function, and by manually testing the data source to see how each parameter, operator and function is supported. Many workdays are required to write and suitably test such a parameter file, and the process is repeated for each new data source to be supported.

Systems to efficiently generate a query language parameter file are therefore desired.

DETAILED DESCRIPTION

The following description is provided to enable any person in the art to make and use the described embodiments and sets forth the best mode contemplated for doing so. Various modifications will remain readily apparent to those in the art.

Figure 2:
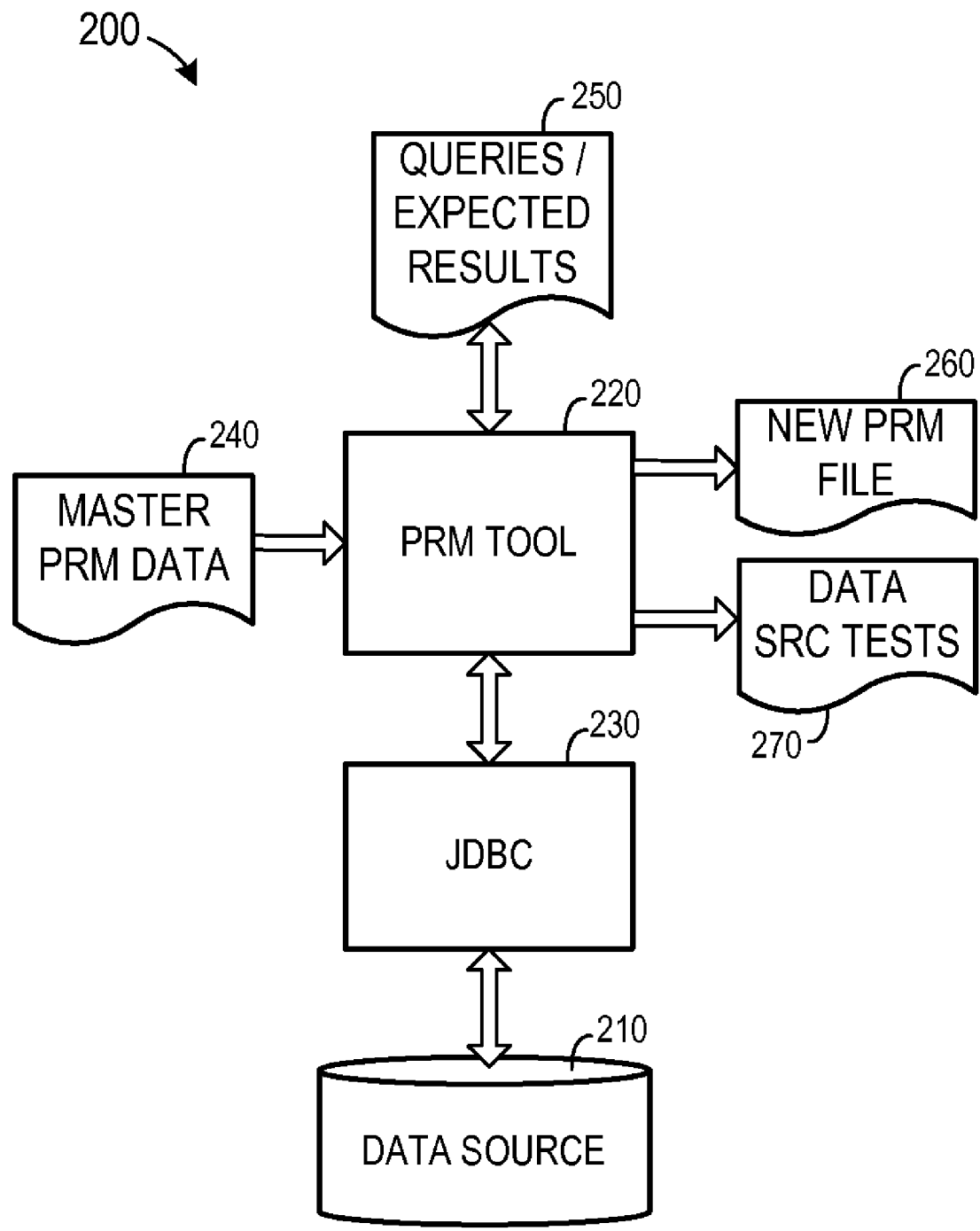
FIG. 2 is a block diagram of a system according to some embodiments.

FIG. 2 is a block diagram illustrating system 200 according to some embodiments. Each element of system 200 may comprise any suitable combination of hardware and/or software, and each element may be located remote from one or more other elements. System 200 may operate according to some embodiments to generate a query language parameter file. Embodiments are not limited to system 200.

Data source 210 may comprise any data source which is responsive to SQL queries. Data source 210 may comprise a RDBMS from any vendor that is or becomes known. Embodiments may operate to generate a parameter file associated with data source 210. The parameter file may describe particularities of the query language supported by data source 210. Accordingly, that a connection server may utilize the parameter file to generate SQL queries suitable for data source 210.

PRM tool 220 may comprise executable program code to generate such a parameter file. As will be described in more detail below, PRM tool 220 generates queries and transmits the queries to data source 210 via Java Database Connector (JDBC) 230, although any relational middleware API (e.g. Open Database Connectivity (ODBC), Object Linking and Embedding, Database (OLE DB), etc.) may be used in conjunction with some embodiments. PRM tool 220 generates the queries based on information contained in master parameter data 240.

Master parameter data 240 comprises a data structure including many query language configuration parameters and two or more values associated with each parameter. In some embodiments, master parameter data 240 aggregates two or more known parameter files which are respectively associated with two or more data sources. Master parameter data 240 may include all known query language configuration parameters and all known values for each query language configuration parameter.

Master parameter data 240 may comprise an eXtensible Markup Language (XML) file. As mentioned above, each parameter of master parameter data 240 may be associated with more than one value. According to some embodiments, each parameter of master parameter data 240 is defined as follows:

```
<Parameter Name="parameter">
    <VariantParameter>Variant1</Variant Parameter>
    <VariantParameter>Variant2</Variant Parameter>
    ...
</Parameter>.
```

In a specific example, it is known that some data sources support '+' as the CONCAT operator and some data sources support '||' as the CONCAT operator. Based on the foregoing XML schema, master parameter data 240 defines the CONCAT parameter as follows:

```
<Parameter Name="CONCAT">
    <VariantParameter>+</Variant Parameter>
    <VariantParameter>||</Variant Parameter>
</Parameter>.
```

Other parameters may be associated with two values 'Y' and 'N', and are represented as follows:

```
<Parameter Name="CASE_SENSITIVE">
    <VariantParameter>N</Variant Parameter>
    <VariantParameter>Y</Variant Parameter>
</Parameter>.
```

A parameter file may also include parameters associated with operators and functions. In another example, a NUMBER_TO_CHAR(x) function is provided by 'to_char(x)' in some Oracle databases and by 'CAST(X as CHAR(30))' in some Teradata databases. Accordingly, master parameter data 240 may include:

```
<Parameter Name="NUMBER_TO_CHAR(x)">
    <VariantParameter> to_char(x)</Variant Parameter>
    <VariantParameter> CAST(X as CHAR(30))</Variant Parameter>
</Parameter>.
```

PRM tool 220 generates queries based on master parameter data 240 and also generates expected results associated with the generated queries. Generation of queries/expected results 250 according to some embodiments will be described below with respect to FIG. 3.

Figure 1:
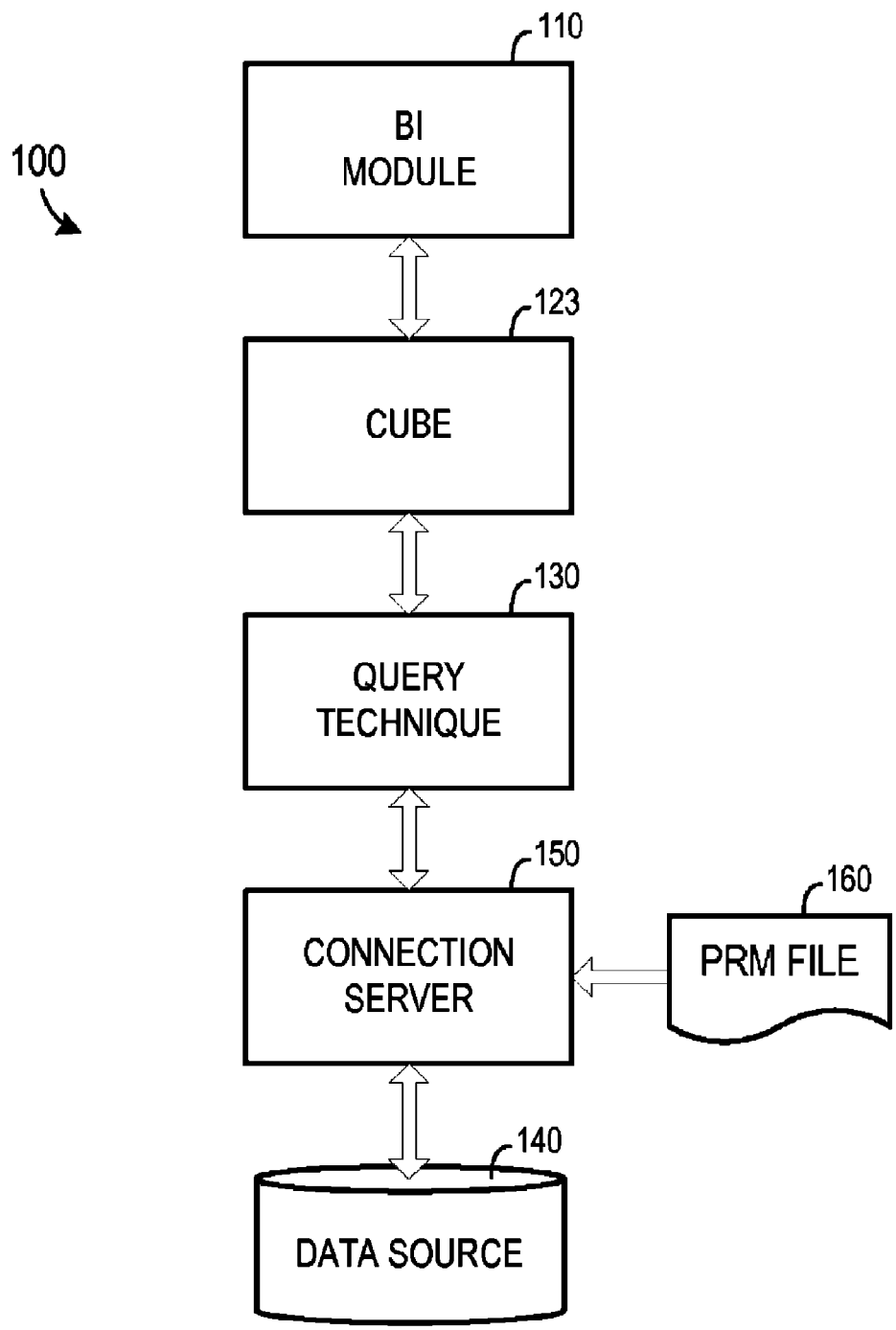
FIG. 1 is a block diagram of a conventional system.

PRM tool 220 generates new parameter file 260 based on queries/expected results 250. New parameter file 260 is associated with data source 210 and may be used to facilitate querying of data source 210 in a system such as, but not limited to, system 100 of FIG. 1. New parameter file 260 may comprise an XML file associating a single value to each of many query language parameters. For example, if data source 210 does not support backquotes, new parameter file 260 may include the tag .

According to some embodiments, PRM tool 220 also generates data source tests 270. Data source tests 270 may include the queries used to generate new parameter file 260 and the result of each query. Accordingly, the queries of data source tests 270 may be applied against a new data source and, by comparing the results received from the new data source with the associated results stored in data source tests 270, PRM tool 220 may determine whether the new data source reflects the same SQL particularities as data source 210.

Figure 3:
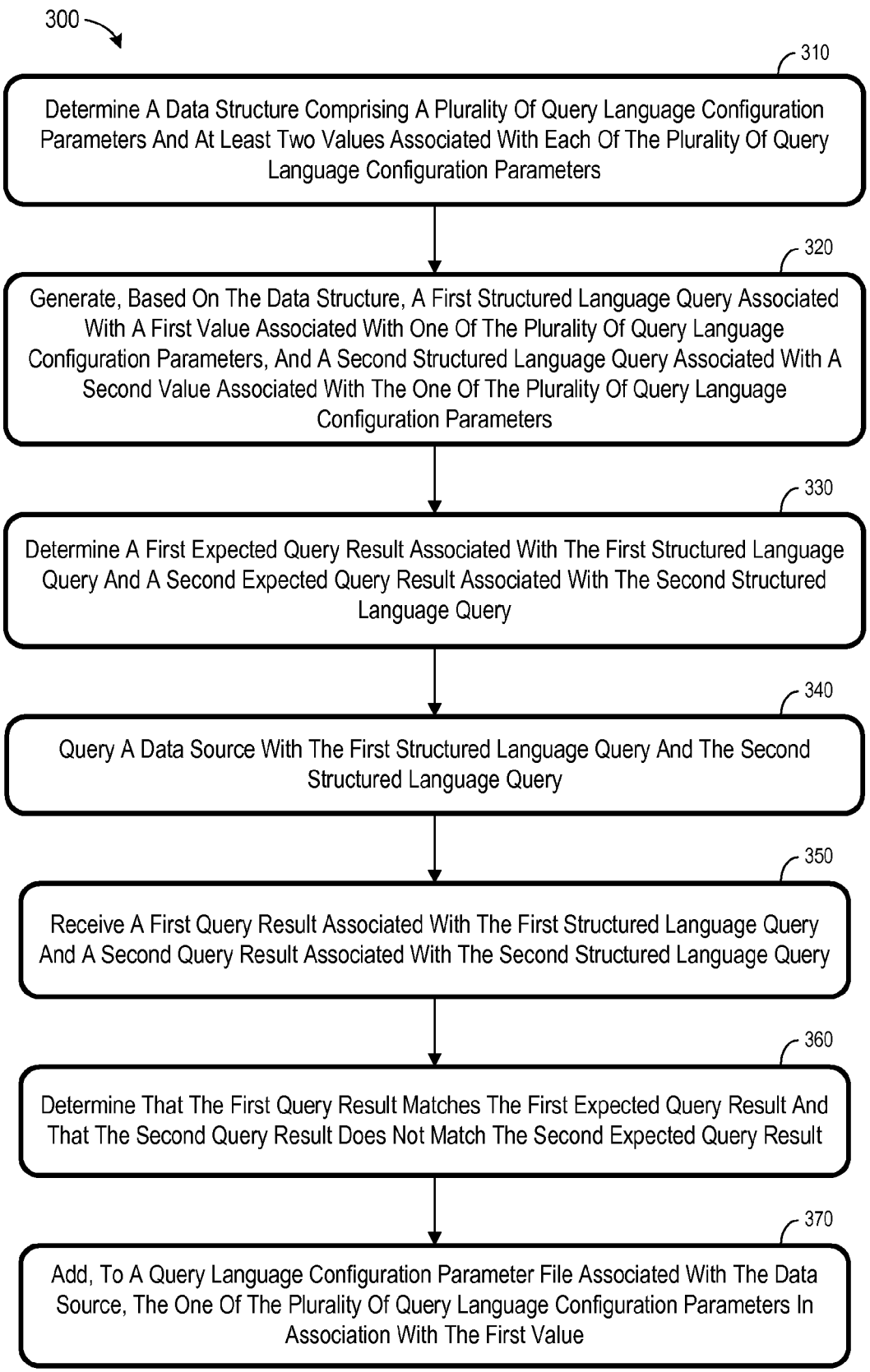
FIG. 3 is a flow diagram of a process according to some embodiments.

FIG. 3 is a flow diagram of process 300 according to some embodiments. Process 300 may be executed by hardware and embodied in program code stored on a tangible medium, but embodiments are not limited thereto. Process 300 is embodied in PRM tool 220 in some embodiments.

A data structure is initially determined at 310. The data structure includes a plurality of query language configuration parameters and at least two values associated with each of the plurality of query language configuration parameters. The data structure may comprise master parameter data 240 of system 200. The data structure may be created prior to or during 310 by obtaining parameter files associated with several data sources, aggregating all parameters of the obtained parameter files, and aggregating all values associated with each aggregated parameter.

For example, the data structure may be created by obtaining an Oracle parameter file including the parameter NUMBER_TO_CHAR(x) in association with value 'to_char(x)', and a Teradata parameter file including the parameter NUMBER_TO_CHAR(x) in association with value 'CAST(X as CHAR(30))'. The data structure aggregates the foregoing by associating the values 'to_char(x)' and 'CAST(X as CHAR(30)) with the parameter NUMBER_TO_CHAR(x). The aggregation may be represented in an XML structure as described above.

Next, at 320, a first structured language query is generated based on the data structure. The first structured language query is associated with a first value associated with one of the plurality of query language configuration parameters of the data structure. 320 also includes generating a second structured language query that is associated with a second value associated with the one of the plurality of query language configuration parameters.

An example of 320 is now provided with respect to the parameter CONCAT. It is assumed that the data structure includes the parameter CONCAT in association with values '+' and '||'. As described above, the data structure may store an XML representation of this association as follows:

```
<Parameter Name="CONCAT">
    <VariantParameter>+</Variant Parameter>
    <VariantParameter>||</Variant Parameter>
</Parameter>
```

According to this example, the first structured language query generated at 320 may be "SELECT 'a'+'b'" and the generated second structured language query may be "SELECT 'a'||'b'".

A first expected query result associated with the first structured language query is determined at 330, and a second expected query result associated with the second structured language query is also determined at 330. Continuing with the above example, both the first and second expected query results are indicators of success. The data source is queried with the first structured language query and with the second structured language query at 340 (e.g., using JDBC 230), and first and second query results are received at 350. The first query result is associated with (i.e., results from) the first structured language query and the second query result is associated with the second structured language query.

According to process 300, it is determined at 360 that the first query result matches the first expected query result and that the second query result does not match the second expected query result. In the present example, the first query was successful and the second query was unsuccessful. More specifically, the data source uses '+' for the CONCAT operator and does not use '||'

Depending on the queries and the data source, 360 may comprise a determination that the first query result does not match the first expected query result and that the second query result matches the second expected query result. Of course, both or neither of the first query result and the second query result may match their corresponding expected query results.

The query language configuration parameter is added in association with the first value to a query language configuration parameter file at 370. The query language configuration parameter file is associated with the queried data source, and may comprise new parameter file 260 in some embodiments. To complete the current example, the XML code may be added to the file at 370.

Flow may return to 320 to process another parameter (and associated values) from the data structure. A parameter and one or more associated values are added to the parameter file during each iteration of process 300.

Figure 4:
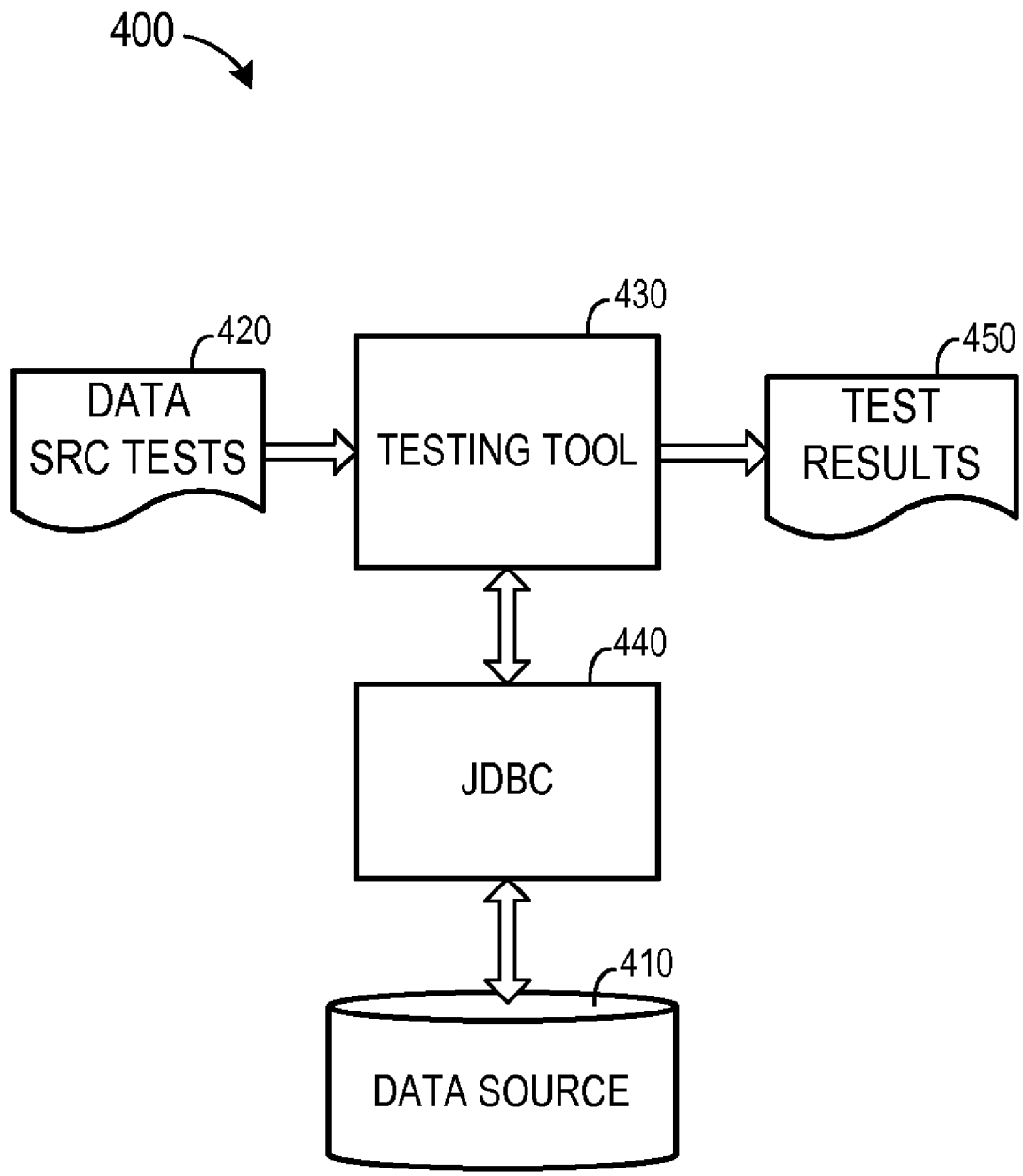
FIG. 4 is a block diagram of a testing system according to some embodiments.

In some embodiments, each query and query result generated during process 300 is stored in data source tests 270. Data source tests 270 thereby define the behavior of the data source in response to the queries. FIG. 4 is a block diagram of system 400 including data source 410 and data source tests 420 which were generated by applying process 300 to a different data source. System 400 may be used to determine whether new data source 410 behaves similarly to the different data source.

More particularly, testing tool 430 (e.g., a software application) may read a query and its associated expected result from data source tests 420. Testing tool 430 may apply the query against data source 410 using JDBC 440. Testing tool 430 receives a corresponding query result and compares the result to the expected result that was read from data source tests 420. Results of the comparison may be stored in test results 450. Test results 450 may therefore indicate differences between the particularities of the query language supported by data source 410 and those of the query language supported by the data source from which data source tests 420 were generated.

The data structure of process 300 may also include parameters representing operators and functions. For each operator or function of the data structure, embodiments of process 300 may employ the following strategy:

1) Define a function f having variable A ($A_0, A_1, \ldots, A_N$).
2) Translate the function to $FM_0, \ldots, FM_M$.
3) For each translation I from the $FM_M$ translations, take N random values for each $A_N$ and apply the succession of queries against the data source.

For example: "CREATE TABLE AAA (aaa INTEGER)", "SELECT $FM_i$ ($A_0, A_1, \ldots, A_N$) FROM AAA", "DROP TABLE AAA".

If the query succeeds, the function f with the translation $FM_i$ is supported. The function and the translation are therefore added to the query language configuration parameter file at 370. Of course, a function supported by the data source cannot be added to the query language configuration parameter file if the function is not specified in the initial data structure (e.g., master parameter data 240). Similarly, process 300 will not add a parameter to the parameter file if the parameter is not present in the initial data structure.

Figure 5:
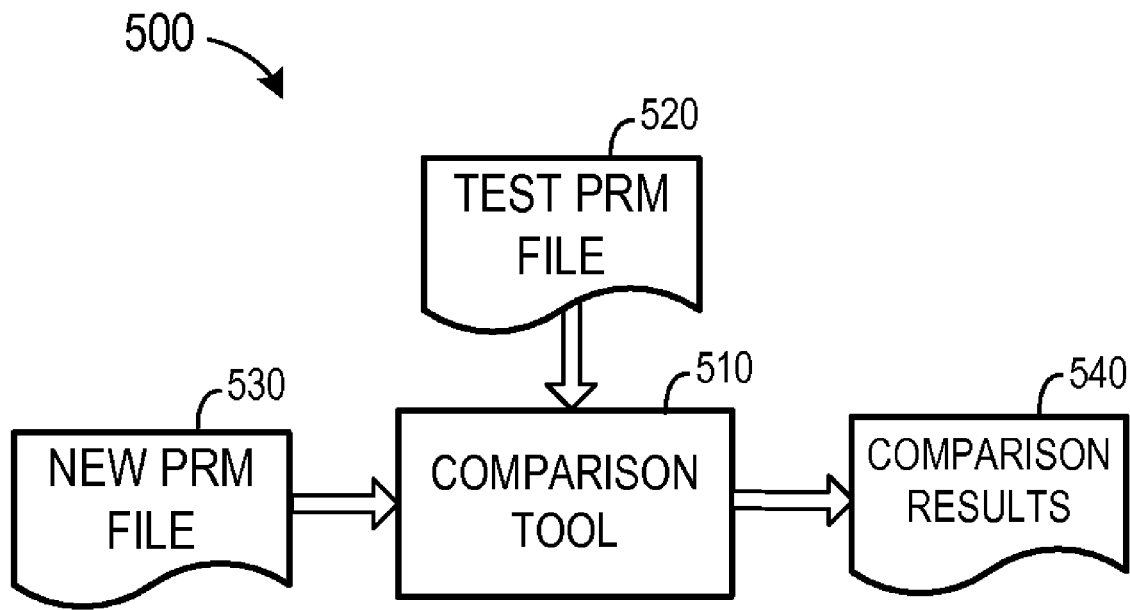
FIG. 5 is a block diagram of a verification system according to some embodiments.

FIG. 5 is a block diagram of a system to evaluate a parameter file according to some embodiments. Comparison tool 510 may comprise a software application which receives test parameter file 520 as input. Test parameter file 520 may comprise a parameter file describing a particular data source and generated with respect to the particular data source as described herein.

Comparison tool 510 also receives new parameter file 530, which may be intended for use with the particular data source. Comparison tool 510 compares test parameter file 520 and new parameter file 530 and outputs the results of the comparison to comparison results 540. System 500 thereby provides a determination of the suitability of new parameter file 530 with the particular data source.

The embodiments described herein are solely for the purpose of illustration. Those in the art will recognize that other embodiments may be practiced with modifications and alterations limited only by the claims.

What is claimed is:

1. A computer-implemented method comprising:
   determining a data structure comprising a plurality of query language configuration parameters and at least two values associated with each of the plurality of query language configuration parameters;
   generating, based on the data structure, a first structured language query associated with a first value associated with one of the plurality of query language configuration parameters, and a second structured language query associated with a second value associated with the one of the plurality of query language configuration parameters;
   determining a first expected query result that is associated with the first structured language query and expected in response to the first structured language query if a data source supports a first particularity;
   determining a second expected query result that is associated with the second structured language query and expected in response to the second structured language query if the data source supports a second particularity rather than the first particularity;
   querying the data source with the first structured language query;
   querying the data source with the second structured language query;
   receiving a first query result associated with the first structured language query and a second query result associated with the second structured language query;
   comparing the first query result to the first expected query result that is associated with the first structured language query and expected in response to the first structured language query if the data source supports the first particularity;
   comparing the second query result to the second expected query result that is associated with the second structured language query and expected in response to the second structured language query if the data source supports a second particularity rather than the first particularity;
   determining that the first query result matches the first expected query result that is associated with the first structured language query and expected in response to the first structured language query if the data source supports the first particularity;
   determining that the second query result does not match the second expected query result that is associated with the second structured language query and expected in response to the second structured language query if the data source supports a second particularity rather than the first particularity; and
   in response to the determining that the first query result matches the first expected query result that is associated with the first structured language query and expected in response to the first structured language query if the data source supports the first particularity, adding, to a query language configuration parameter file associated with the data source, the one of the plurality of query language configuration parameters in association with the first value.

2. A method according to claim 1, further comprising:
   in response to the determining that the second query result does not match the second expected query result, determining to not associate the one of the plurality of query language configuration parameters with the second value in the query language configuration parameter file associated with the data source.

3. A method according to claim 1, wherein the first value and the second value are mutually exclusive values of the one query language configuration parameter.

4. A method according to claim 1, further comprising:
generating, based on the data structure, a third structured language query associated with a third value associated with the one of the plurality of query language configuration parameters;
determining a third expected query result associated with the third structured language query;
querying the data source with the third structured language;
receiving a third query result associated with the third structured language query;
determining that the third query result does not match the third expected query result; and
determining to not associate the one of the plurality of query language configuration parameters with the third value in the query language configuration parameter file associated with the data source.

5. A method according to claim 1, further comprising:
generating, based on the data structure, a third structured language query associated with a third value associated with a second one of the plurality of query language configuration parameters, and a fourth structured language query associated with a fourth value associated with the second one of the plurality of query language configuration parameters;
determining a third expected query result associated with the third structured language query and a fourth expected query result associated with the fourth structured language query;
querying the data source with the third structured language query and the fourth structured language query;
receiving a third query result associated with the third structured language query and a fourth query result associated with the fourth structured language query;
determining that the third query result matches the third expected query result and that the fourth query result does not match the fourth expected query result; and
adding, to the query language configuration parameter file associated with the data source, the second one of the plurality of query language configuration parameters in association with the third value.

6. A method according to claim 5, further comprising:
querying a second data source with the first structured language query and receiving a first test result;
comparing the first test result with the first expected query result;
querying the second data source with the second structured language query and receiving a second test result;
comparing the second test result with the second expected query result;
querying the second data source with the third structured language query and receiving a third test result;
comparing the third test result with the third expected query result;
querying the second data source with the fourth structured language query and receiving a fourth test result; and
comparing the fourth test result with the fourth expected query result.

7. A method according to claim 1, further comprising:
querying a second data source with the first structured language query and receiving a first test result;
comparing the first test result with the first expected query result;
querying the second data source with the second structured language query and receiving a second test result; and
comparing the second test result with the second expected query result.

8. A method according to claim 1, further comprising:
determining any differences between the query language configuration parameter file associated with the data source and a second query language configuration parameter file associated with the data source.

9. A method according to claim 1, wherein the determining a first expected query result that is associated with the first structured language query and expected in response to the first structured language query if a data source supports a first particularity comprises:
determining a first expected query result that is associated with the first structured language query and expected in response to the first structured language query if a data source supports a '+' as a CONCAT operator; and
wherein the determining a second expected query result that is associated with the second structured language query and expected in response to the second structured language query if the data source supports a second particularity rather than the first particularity comprises:
determining a second expected query result that is associated with the second structured language query and expected in response to the second structured language query if the data source supports a '||' as a CONCAT operator rather than a '+' as a CONCAT operator.

10. A non-transient computer-readable medium having stored thereon program code, the program code executable by a computer to:
determine a data structure comprising a plurality of query language configuration parameters and at least two values associated with each of the plurality of query language configuration parameters;
generate, based on the data structure, a first structured language query associated with a first value associated with one of the plurality of query language configuration parameters, and a second structured language query associated with a second value associated with the one of the plurality of query language configuration parameters;
determine a first expected query result that is associated with the first structured language query and expected in response to the first structured language query if a data source supports a first particularity;
determine a second expected query result that is associated with the second structured language query and expected in response to the second structured language query if the data source supports a second particularity rather than the first particularity;
query the data source with the first structured language query;
query the data source with the second structured language query;
receive a first query result associated with the first structured language query and a second query result associated with the second structured language query;
compare the first query result to the first expected query result that is associated with the first structured language query and expected in response to the first structured language query if the data source supports the first particularity;
compare the second query result to the second expected query result that is associated with the second structured language query and expected in response to the second structured language query if the data source supports a second particularity rather than the first particularity;

determine that the first query result matches the first expected query result that is associated with the first structured language query and expected in response to the first structured language query if the data source supports the first particularity;

determine that the second query result does not match the second expected query result that is associated with the second structured language query and expected in response to the second structured language query if the data source supports a second particularity rather than the first particularity; and in response to the determine that the first query result matches the first expected query result that is associated with the first structured language query and expected in response to the first structured language query if the data source supports the first particularity, add, to a query language configuration parameter file associated with the data source, the one of the plurality of query language configuration parameters in association with the first value.

11. A medium according to claim 10, the program code further executable by a computer to:

determine to not associate the one of the plurality of query language configuration parameters with the second value in the query language configuration parameter file associated with the data source.

12. A medium according to claim 10, wherein the first value and the second value are mutually exclusive values of the one query language configuration parameter.

13. A medium according to claim 10, the program code further executable by a computer to:

generate, based on the data structure, a third structured language query associated with a third value associated with the one of the plurality of query language configuration parameters;

determine a third expected query result associated with the third structured language query;

query the data source with the third structured language;

receive a third query result associated with the third structured language query;

determine that the third query result does not match the third expected query result; and determine to not associate the one of the plurality of query language configuration parameters with the third value in the query language configuration parameter file associated with the data source.

14. A medium according to claim 10, the program code further executable by a computer to:

generate, based on the data structure, a third structured language query associated with a third value associated with a second one of the plurality of query language configuration parameters, and a fourth structured language query associated with a fourth value associated with the second one of the plurality of query language configuration parameters;

determine a third expected query result associated with the third structured language query and a fourth expected query result associated with the fourth structured language query;

query the data source with the third structured language query and the fourth structured language query;

receive a third query result associated with the third structured language query and a fourth query result associated with the fourth structured language query;

determine that the third query result matches the third expected query result and that the fourth query result does not match the fourth expected query result; and add, to the query language configuration parameter file associated with the data source, the second one of the plurality of query language configuration parameters in association with the third value.

15. A medium according to claim 14, the program code further executable by a computer to:

query a second data source with the first structured language query and receiving a first test result;

compare the first test result with the first expected query result;

query the second data source with the second structured language query and receiving a second test result;

compare the second test result with the second expected query result;

query the second data source with the third structured language query and receiving a third test result;

compare the third test result with the third expected query result;

query the second data source with the fourth structured language query and receiving a fourth test result; and compare the fourth test result with the fourth expected query result.

16. A medium according to claim 10, the program code further executable by a computer to:

query a second data source with the first structured language query and receiving a first test result;

compare the first test result with the first expected query result;

query the second data source with the second structured language query and receiving a second test result; and compare the second test result with the second expected query result.

17. A medium according to claim 10, the program code further executable by a computer to:

determine any differences between the query language configuration parameter file associated with the data source and a second query language configuration parameter file associated with the data source.

18. A medium according to claim 10, wherein the determine a first expected query result that is associated with the first structured language query and expected in response to the first structured language query if a data source supports a first particularity comprises:

determine a first expected query result that is associated with the first structured language query and expected in response to the first structured language query if a data source supports a '+' as a CONCAT operator; and wherein the determine a second expected query result that is associated with the second structured language query and expected in response to the second structured language query if the data source supports a second particularity rather than the first particularity comprises:

determine a second expected query result that is associated with the second structured language query and expected in response to the second structured language query if the data source supports a '||' as a CONCAT operator rather than a '+' as a CONCAT operator.

19. A system comprising:

hardware to:

determine a data structure comprising a plurality of query language configuration parameters and at least two values associated with each of the plurality of query language configuration parameters;

generate, based on the data structure, a first structured language query associated with a first value associated with one of the plurality of query language configuration parameters, and a second structured language query associated with a second value associated with the one of the plurality of query language configuration parameters;

determine a first expected query result that is associated with the first structured language query and expected in response to the first structured language query if a data source supports a first particularity;

determine a second expected query result that is associated with the second structured language query and expected in response to the second structured language query if the data source supports a second particularity rather than the first particularity;

query the data source with the first structured language query;

query the data source with the second structured language query;

receive a first query result associated with the first structured language query and a second query result associated with the second structured language query;

compare the first query result to the first expected query result that is associated with the first structured language query and expected in response to the first structured language query if the data source supports the first particularity;

compare the second query result to the second expected query result that is associated with the second structured language query and expected in response to the second structured language query if the data source supports a second particularity rather than the first particularity;

determine that the first query result matches the first expected query result that is associated with the first structured language query and expected in response to the first structured language query if the data source supports the first particularity;

determine that the second query result does not match the second expected query result that is associated with the second structured language query and expected in response to the second structured language query if the data source supports a second particularity rather than the first particularity; and in response to the determine that the first query result matches the first expected query result that is associated with the first structured language query and expected in response to the first structured language query if the data source supports the first particularity, add, to a query language configuration parameter file associated with the data source, the one of the plurality of query language configuration parameters in association with the first value.

20. A system according to claim 19, the hardware further to:

determine to not associate the one of the plurality of query language configuration parameters with the second value in the query language configuration parameter file associated with the data source.

21. A system according to claim 19, wherein the first value and the second value are mutually exclusive values of the one query language configuration parameter.

22. A system according to claim 19, the hardware further to:

generate, based on the data structure, a third structured language query associated with a third value associated with the one of the plurality of query language configuration parameters;

determine a third expected query result associated with the third structured language query;

query the data source with the third structured language;

receive a third query result associated with the third structured language query;

determine that the third query result does not match the third expected query result; and determine to not associate the one of the plurality of query language configuration parameters with the third value in the query language configuration parameter file associated with the data source.

23. A system according to claim 19, the hardware further to:

generate, based on the data structure, a third structured language query associated with a third value associated with a second one of the plurality of query language configuration parameters, and a fourth structured language query associated with a fourth value associated with the second one of the plurality of query language configuration parameters;

determine a third expected query result associated with the third structured language query and a fourth expected query result associated with the fourth structured language query;

query the data source with the third structured language query and the fourth structured language query;

receive a third query result associated with the third structured language query and a fourth query result associated with the fourth structured language query;

determine that the third query result matches the third expected query result and that the fourth query result does not match the fourth expected query result; and add, to the query language configuration parameter file associated with the data source, the second one of the plurality of query language configuration parameters in association with the third value.

24. A system according to claim 19, the hardware further to:

query a second data source with the first structured language query and receive a first test result;

compare the first test result with the first expected query result;

query the second data source with the second structured language query and receiving a second test result; and compare the second test result with the second expected query result.

25. A system according to claim 19, wherein the determine a first expected query result that is associated with the first structured language query and expected in response to the first structured language query if a data source supports a first particularity comprises:

determine a first expected query result that is associated with the first structured language query and expected in response to the first structured language query if a data source supports a '+' as a CONCAT operator; and wherein the determine a second expected query result that is associated with the second structured language query and expected in response to the second structured language query if the data source supports a second particularity rather than the first particularity comprises:

determine a second expected query result that is associated with the second structured language query and expected in response to the second structured language query if the data source supports a '||' as a CONCAT operator rather than a '+' as a CONCAT operator.

* * * * *